(12) United States Patent
Stock et al.

(10) Patent No.: US 6,278,555 B1
(45) Date of Patent: *Aug. 21, 2001

(54) LASER SCANNING MICROSCOPE

(75) Inventors: Michael Stock, Apolda; Ulrich Simon, Rothenstein; Ralf Wolleschensky, Schoeten, all of (DE)

(73) Assignee: Carl Zeiss Jena GmbH, Jena (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,747

(22) Filed: Dec. 21, 1998

(30) Foreign Application Priority Data

Jul. 4, 1998 (DE) ............................... 198 29 953

(51) Int. Cl.[7] .............................. G02B 27/14; G02B 21/02
(52) U.S. Cl. ............................................. 359/634; 359/656
(58) Field of Search .................... 359/634, 368, 359/656, 660, 661, 385

(56) References Cited

U.S. PATENT DOCUMENTS

| 4,632,554 | * | 12/1986 | Pearce | 356/349 |
|---|---|---|---|---|
| 5,535,052 | * | 7/1996 | Jörgens | 359/388 |
| 5,874,726 | * | 2/1999 | Haydon | 250/201.1 |
| 5,910,963 | * | 6/1999 | Simon | 372/98 |
| 5,936,728 | * | 8/1999 | Bouzid | 356/318 |
| 5,936,764 | * | 8/1999 | Kobayashi | 359/385 |
| 5,952,668 | * | 9/1999 | Baer | 250/492.2 |
| 6,167,173 | * | 12/2000 | Schoeppe et al. | 385/3 |
| 6,178,041 | * | 1/2001 | Simon | 359/368 |

FOREIGN PATENT DOCUMENTS

| 4221063 | | 1/1994 | (DE) . | |
| 411231222 | * | 8/1999 | (JP) | G02B/21/00 |

* cited by examiner

Primary Examiner—Georgia Epps
Assistant Examiner—Saeed Seyrafi
(74) Attorney, Agent, or Firm—Reed Smith LLP

(57) ABSTRACT

A laser scanning microscope with raster-type illumination at different wavelengths comprises laser radiation which is coupled in by light-conducting fibers, wherein the coupling in of the illumination is carried out by at least one dichroic beam splitter which reflects in at least one wavelength range and transmits in at least a second wavelength range.

3 Claims, 4 Drawing Sheets

LASER SCANNING MICROSCOPE

FIELD OF THE INVENTION

The invention relates to a microscope unit M and a scan head S as shown in FIG. 5 which have a common optical interface via an intermediate image and which form a LSM (laser scanning microscope).

OBJECT AND SUMMARY OF THE INVENTION

The primary object of the invention is to provide a laser scanning microscope having the ability of coupling in an IR laser, a laser in the visible range and a laser in the UV range without encountering adjustment problems in exchanging lasers or beam splitters in various operating modes.

The above object can be achieved, in accordance with the invention, by a raster type illumination at different wavelengths comprising means for coupling in laser radiation by light-conducting fibers, wherein the coupling in of the illumination is carried out by at least one dichroic beam splitter which reflects in at least one wavelength range and transmits in at least a second wavelength range.

BRIEF DESCRIPTION OF THE DRAWINGS

In the drawings:

FIG. 2b illustrates the reflectivity of the dichroic deflecting element as a function of the reflection of the radiated wavelength for FIG. 2a;

FIG. 3a illustrates a side view of beam deflecting elements where a laser in the visible range is coupled in;

DESCRIPTION OF THE PREFERRED EMBODIMENTS

Figure 1:
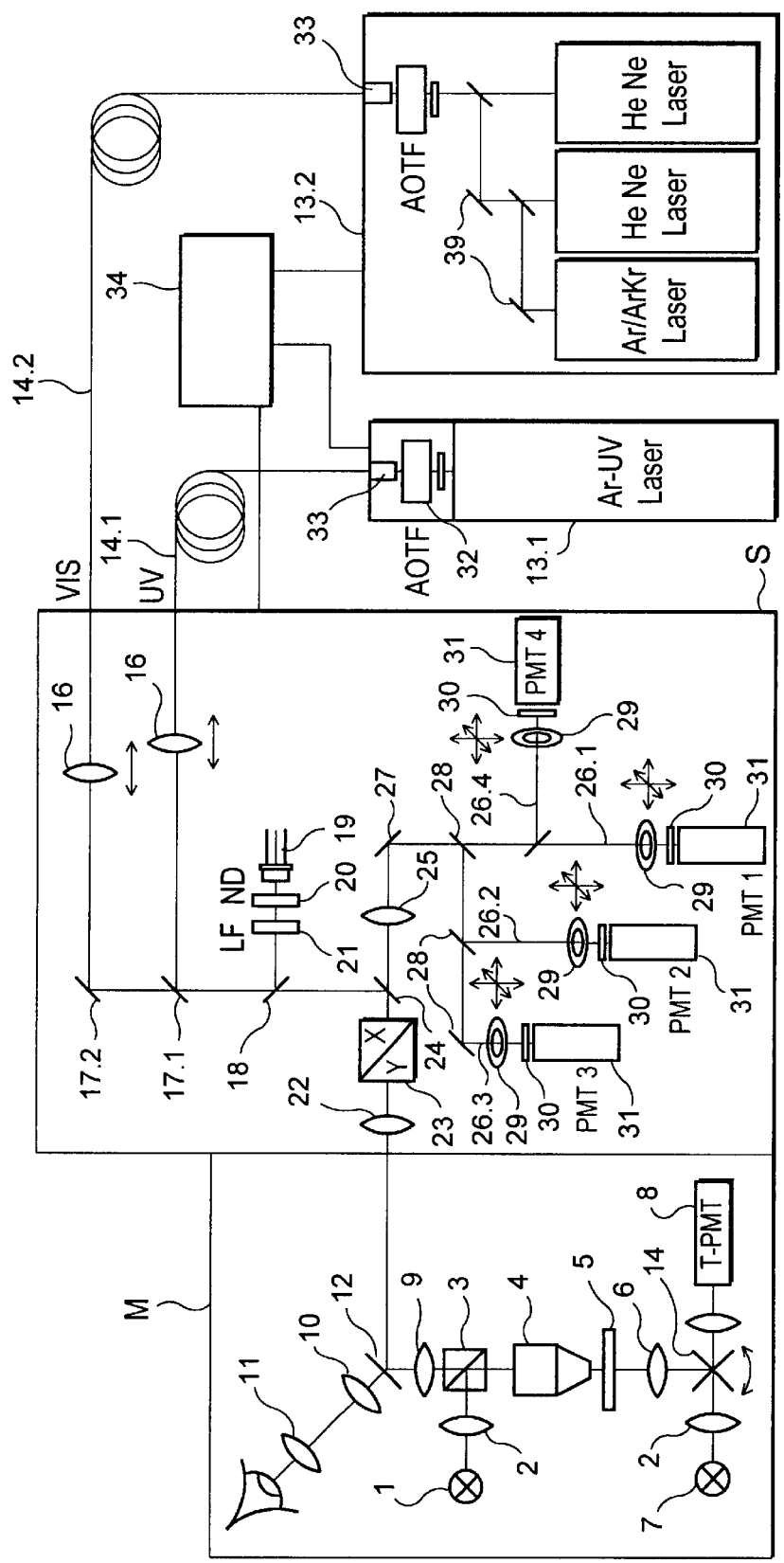
FIG. 1 is a schematic representation of a laser scanning microscope in accordance with the invention.

The laser scan microscope of FIG. 1 has a scan head S which can be mounted on the phototube of an upright microscope as well as on a lateral output of an inverse microscope.

The drawings show a microscope beam path which is switchable between incident light scanning and transmitted light scanning by means of a swivelable mirror 14, with a light source 1, illumination optics 2, beam splitter 3, objective 4, specimen stage 5, condenser 6, light source 7, receiver arrangement 8, a first tube lens 9, an observation beam path with a second tube lens 10 and an eyepiece 11, and a beam splitter for coupling in the scanning beam. A laser module 13.1, 13.2 holds the laser and is connected via monomode light-conducting fibers 14.1, 14.2 with the laser input coupling unit of the scan head S.

It is also possible to mix the radiation of different lasers at the fiber input; this can be carried out with the assistance of the exchangeable and switchable splitter mirror 39, shown schematically, in the module 13.2.

The coupling of radiation into the light-conducting fibers 14.1, 14.2 is carried out by displaceable collimating optics and beam deflecting elements 17.1, 17.2. A monitoring beam path is stopped down by means of a partially reflecting mirror 18 in the direction of a monitor diode 19, wherein line filters 21 and neutral filters 20 are advantageously arranged in front of the monitor diode 19 on a rotatable filter wheel, not shown.

The actual scan unit comprises a scanning objective 22, X/Y scanner 23, main beam splitter 24 and common imaging optics 25 for detection channels 26.1–26.4.

A deflecting prism 27 arranged behind the imaging optics 25 reflects the radiation coming from the object 5 in the direction of dichroic beam splitters 28 in the convergent beam path of the imaging optics 25, wherein pinholes 29 which are displaceable in the direction of and vertical to the optical axis and which are adjustable in diameter are arranged along with emission filters 30 and suitable receiver elements 31 (PMT) individually for each detection channel following the beam splitters 28. A control unit/computer unit 34 is connected, among others, with the stage 5 and the scanners 23 and controls them.

Figure 2A:
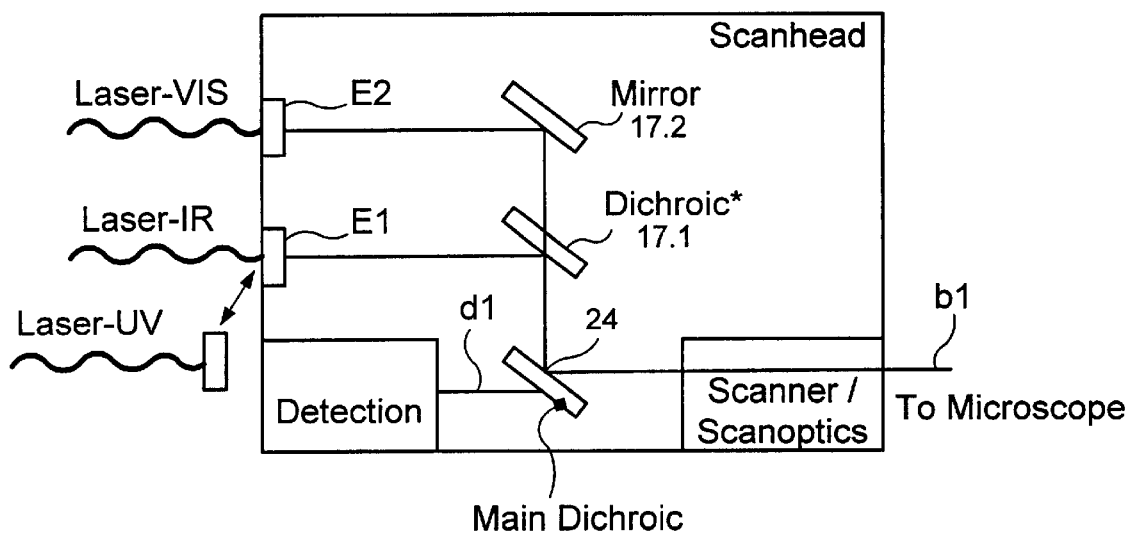
FIG. 2a illustrates a side of the beam deflecting elements and beam splitter of the invention.

FIG. 2a shows a side view of the beam deflecting elements 17.2 and 17.1 and the main beam splitter 24 which is dichroic and serves to separate the illumination beam path bI from the detection beam path dI.

Figure 2B:
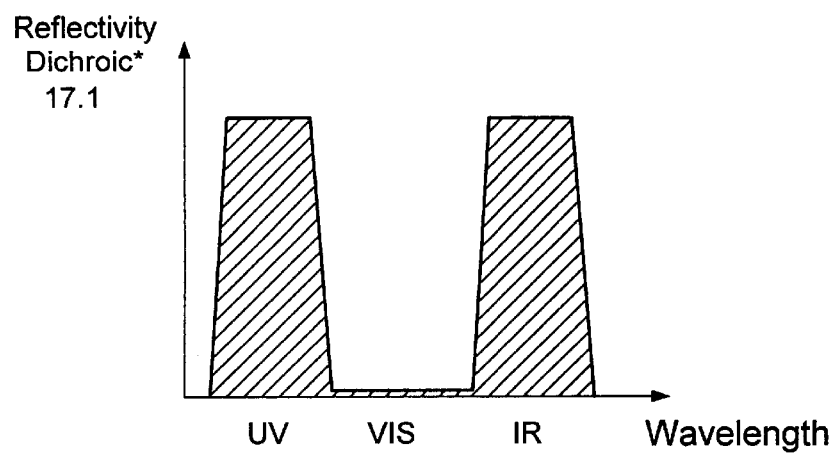

The beam splitter 17.1 is advantageously constructed as a dichroic beam splitter with respect to its reflectivity such that it has a reflectivity range in the UV region and a transmission range in the IR region as is shown in FIG. 2b as a function of the reflection of the radiated wavelength.

This makes it possible to change a laser in the IR range to a laser in the UV range at input E1 or to operate a laser in several operating modes, which expands the range of uses of the laser scanning microscope without the need to provide an additional light-attenuating beam splitter or exchange a beam splitter.

Figure 3A:
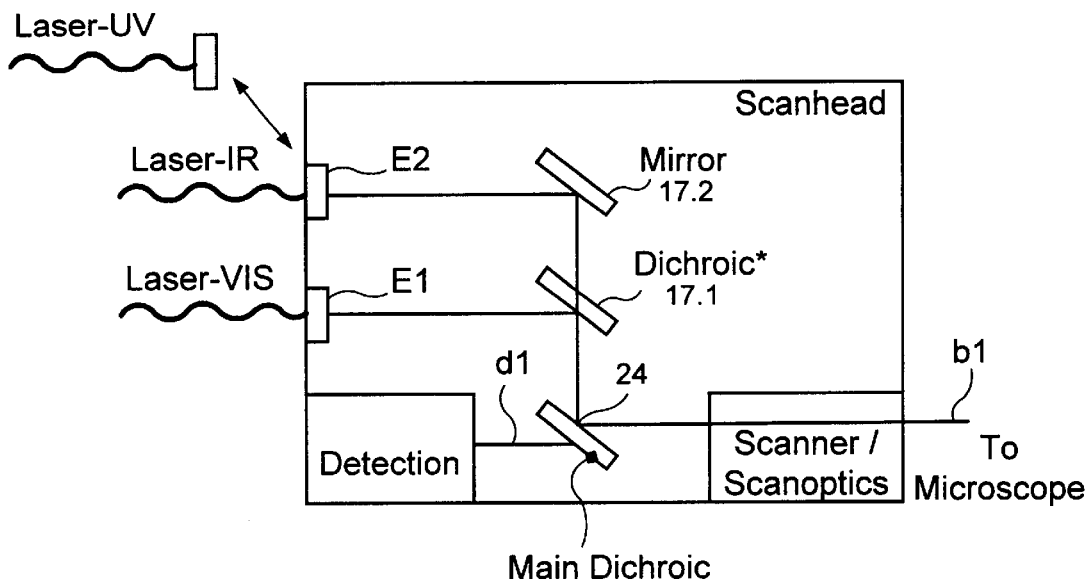
Figure 3B:
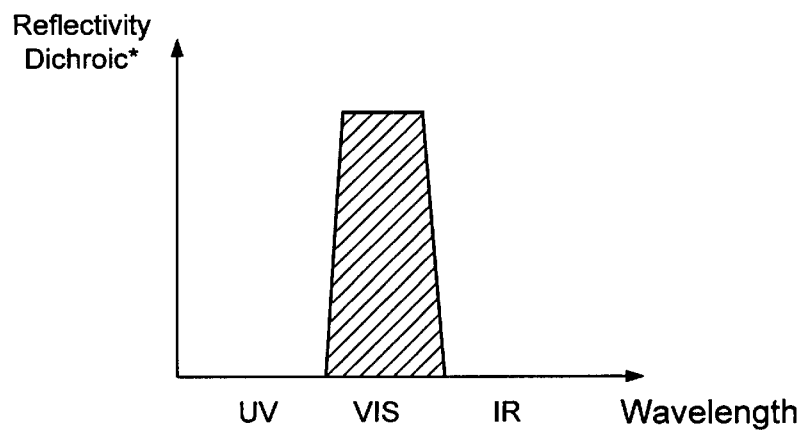
FIG. 3b illustrates the reflection band of the dichoric mirror 17.2.

A laser in the visible range is coupled in at input E1 via a mirror 17.1 as shown in FIG. 3a. In FIG. 3b, the mirror 17.1, which is again constructed as a dichroic mirror, has a reflection band in the visible range and is constructed so as to pass light in the UV and IR ranges. This makes it possible to change between the UV range and IR range at input E2.

Figure 4A:
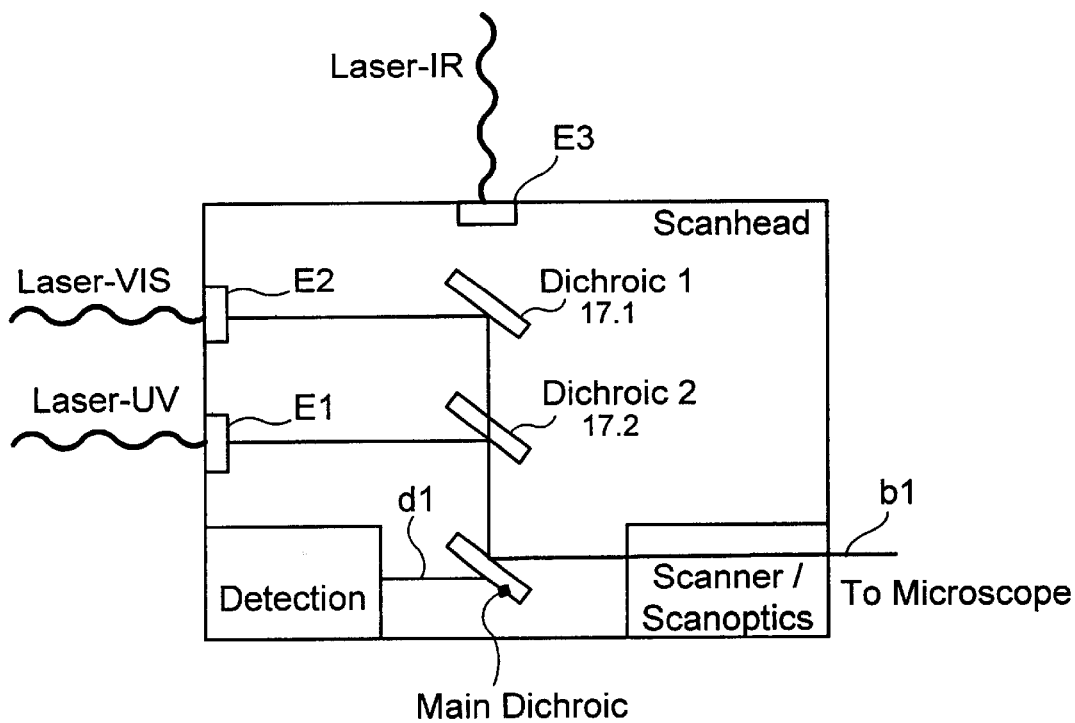
FIG. 4a illustrates a side view of beam deflecting elements in a different embodiment.
Figure 4B:
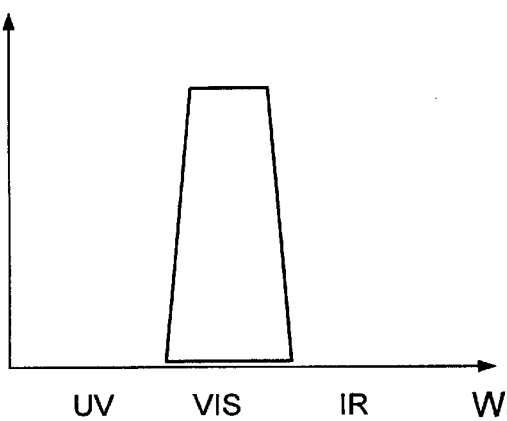
FIG. 4b shows that beam splitter 17.1 of the FIG. 4a arrangement reflects in the visible range.
Figure 4C:
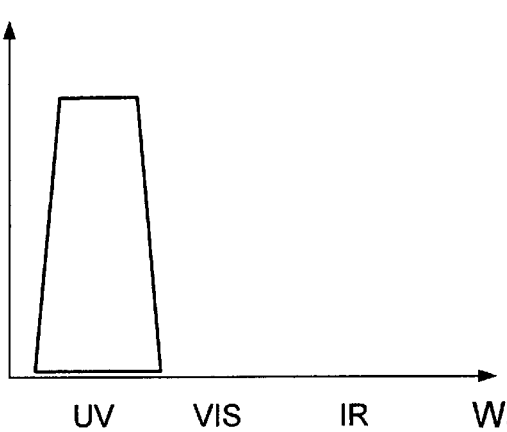
FIG. 4c shows that beam splitter 17.2 reflects in the UV range.

In FIG. 4a, both beam splitters 17.1 and 17.2 are dichroic, wherein beam splitter 17.2 reflects in the visible range (FIG. 4c) and beam splitter 17.1 reflects in the UV range. Splitters 17.1 and 17.2 transmit light in the IR range and splitter 17.2 also transmits light for the visible range.

In this way, it is possible to couple in an IR laser via input E3 as well as a laser in the visible range and a laser in the UV range via E2 and E1 and the adjustment problems entailed in exchanging lasers or beam splitters in the various operating modes can be eliminated.

While the foregoing description and drawings represent the preferred embodiments of the present invention, it will be obvious to those skilled in the art that various changes and modifications may be made therein without departing from the true spirit and scope of the present invention.

What is claimed is:

1. A laser scanning microscope with raster-type illumination at different wavelengths, comprising:

means for coupling in laser radiation by light-conducting fibers, said means for coupling being capable of coupling light in the UV range with light in the visible range and being capable of coupling light in the IR range with light in the visible range, wherein the coupling in of the illumination is carried out by a dichroic beam splitter constructed so as to reflect in the UV and IR ranges and transmit in the visible range.

2. A laser scanning microscope with raster-type illumination at different wavelengths, comprising:

means for coupling in laser radiation by light-conducting fibers, said means for coupling being capable of coupling light in the UV range with light in the visible range and being capable of coupling light in the IR range with light in the visible range, wherein the coupling in of the illumination is carried out by a dichroic beam splitter constructed so as to reflect in the visible range and transmit in the IR and UV ranges.

3. A laser scanning microscope with raster-type illumination at different wavelengths, comprising:

means for coupling in laser radiation by light-conducting fibers, said means for coupling being capable of coupling light in the UV range with light in the visible range and with light in the IR range, wherein the coupling in of the illumination is carried out by a first dichroic beam splitter constructed so as to reflect in the visible range and transmit in the UV and IR ranges, and a second dichroic beam splitter constructed so as to reflect in the UV range and transmit in the visible and IR ranges.

* * * * *